United States Patent

[11] 3,626,999

| [72] | Inventor | Alan R. Jones<br>Miami, Fla. |
|---|---|---|
| [21] | Appl. No. | 806,493 |
| [22] | Filed | Mar. 12, 1969 |
| [45] | Patented | Dec. 14, 1971 |
| [73] | Assignee | American Hospital Supply Corporation<br>Evanston, Ill. |

[54] FLUID DELIVERY APPARATUS
4 Claims, 8 Drawing Figs.

[52] U.S. Cl.................................................. 141/243,
222/266, 222/309, 335/258, 417/416
[51] Int. Cl....................................................... B65b 3/32
[50] Field of Search.......................................... 222/309,
266; 230/15 M; 310/17, 30, 34; 335/251, 255,
258; 417/417, 416; 103/23, 38, 53; 141/130, 242,
250, 243; 192/84 PM

[56] References Cited
UNITED STATES PATENTS

| 2,702,655 | 2/1955 | Lopata............................ | 222/309 X |
| 3,036,604 | 5/1962 | Donofrio........................ | 141/242 X |
| 3,067,786 | 12/1962 | Rosen............................ | 141/242 X |

Primary Examiner—Edward J. Earls
Attorney—Dawson, Tilton, Fallon & Lungmus

ABSTRACT: A fluid handling device especially suited for use in automatic chemical analysis which delivers measured amounts of selected fluids to intermittently advancing sample tubes at selected stopping stations and then, after selected intervals, withdraws predetermined amounts of the mixed fluids from said tubes for photometric analysis.

INVENTOR
ALAN R. JONES
BY
Dawson, Tilton, Fallon & Lungmus
ATT'YS

INVENTOR
ALAN R. JONES

INVENTOR:
ALAN R. JONES
BY
Dawson, Tilton, Fallon & Lungmus
ATT'YS

FLUID DELIVERY APPARATUS

BACKGROUND

While delivery systems for automatic chemical analysis equipment have been known in the past, such systems have been relatively complex in structure and operation and, partly by reason of such complexity, have been subject to malfunctioning and, in general, have been troublesome and expensive to maintain in operation. It will be appreciated that any such malfunctioning may have serious consequences since such automatic chemical analysis equipment is intended for use in performing diagnostic tests on body fluids in clinical laboratories.

Speed in running such diagnostic tests is also of considerable importance because the treatment given patients may depend on the outcome of such tests. While there are a number of different diagnostic tests that may be run in such equipment, present machines have a major shortcoming in their ability to perform only a single type of diagnostic test at one time. Because of the time and effort required to "set up" such a machine for running any given test, it is common laboratory practice to delay the running of a test until a substantial number of samples requiring the same test are accumulated or, alternatively, to forego use of the automatic equipment in favor of manual testing procedures where there are only a limited number of samples requiring the same test procedure. The unfortunate result may be that tests which are urgently required for early diagnosis and treatment may either be delayed for efficient use of the automatic analysis equipment or may be run manually without the benefit of the high degree of accuracy and control inherent in the operation of automatic equipment.

SUMMARY

The apparatus of the present invention is intended for use in automatic analysis equipment wherein a substantial number of different diagnostic tests may be performed simultaneously. Sample tubes containing samples of body fluids to be tested are placed in a transporter which may be of the type disclosed in copending application Ser. No. 688,144, filed Dec. 5, 1967 now U.S. Pat. No. 3,511,613, and such tubes are advanced intermittently or incrementally through a series of treatment stations. For any given diagnostic test there are one or more stopping stations of the series where a selected treatment fluid must be delivered to the sample tubes in which such test is to be performed. Different diagnostic tests require the addition or withdrawal of fluid from other sample tubes at other stopping stations. Whenever the series of sample tubes is stopped, a pumping stroke is executed by a pumping arm or carriage of the apparatus and each tube requiring the addition or extraction of fluid at that moment is automatically subject to such treatment.

Although the carriage executes a pumping stroke during the interval when the series of sample tubes is stopped, actual pumping action does not occur unless means for operatively coupling the carriage to the selected fluid pumps has been activated. In the form of the apparatus disclosed, such coupling means constitutes a plurality of solenoids, one for each fluid pump. If at the time the carriage executes its "pumping" stroke one or more of the solenoids is energized then the pumps associated with those solenoids will deliver (or withdraw) fluid from certain of the momentarily stopped sample tubes. Therefore, where such apparatus is equipped with a multiplicity of pumps, certain pumps being arranged to deliver or withdraw fluids for certain diagnostic tests and other pumps for other tests, each specific pump will be operated during cyclical movement of the carriage only if the solenoid associated with that pump is energized so that fluid is introduced or withdrawn from a given tube of the series at the proper moment. By suitable programming resulting in the energization of the various solenoids at the proper moments, a multiplicity of different diagnostic tests may be carried out simultaneously in the series of sample tubes.

The means for delivering or withdrawing fluid from the sample tubes comprises a plurality of extensible delivery tubes, each delivery tube consisting of a pair of telescoping tubes formed of flexible plastic or other flexible material. The inner tube of each concentric tube assembly extends from a fluid pump to a treatment station of the transporter assembly, the end of the inner tube at the treatment station normally being maintained in position above the sample-carrying tubes advancing intermittently therebeneath. When fluid is to be added or withdrawn from any given sample tube, the innermost plastic tube of a concentric pair is projected downwardly into the sample tube prior to commencement of the pumping stroke. It has been found that the inner tube may be extended most effectively by shifting the outer tube to remove slack only from the outer tube. As a result, the free end of the inner plastic tube is extended without buckling of either tube and dips into the preselected sample tube to deliver or withdraw fluid therefrom. Since fluid extracted from the sample tube is withdrawn from adjacent the bottom thereof an ample supply of fluid is assured; conversely, since fluid delivered to the sample tube is discharged adjacent the lower end thereof a thorough mixing of sample and treatment fluid is achieved.

DRAWINGS

FIG. 8 is an enlarged sectional view showing details of the tube gripping means illustrated generally in FIG. 2.

DESCRIPTION

Figure 1:
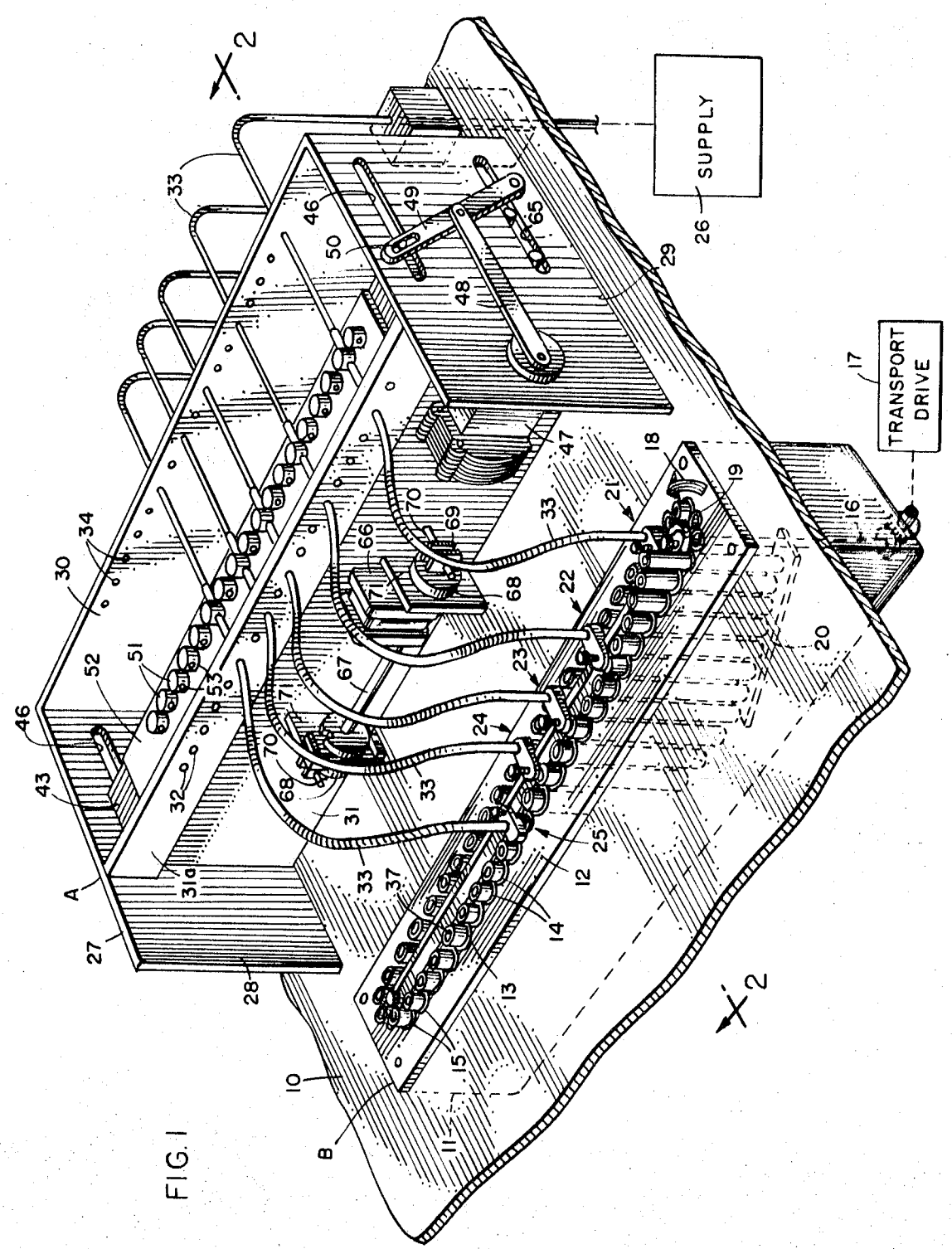
FIG. 1 is a fragmentary perspective view shown schematically in part and illustrating the fluid delivery apparatus of the present invention.

In the embodiment of the invention illustrated in the drawings, the numeral 10 designates the top surface of a console or table upon which the fluid delivery apparatus A is disposed. Normally the fluid delivery apparatus would be enclosed in a suitable cover but such cover has been eliminated from FIG. 1 to reveal the operative structure of the unit.

Near the delivery apparatus is a sample transport assembly B. FIG. 1 illustrates a transporter which is similar in construction and operation to the unit disclosed in copending application Ser. No. 688,144, filed Dec. 5, 1967. In brief, the transporter consists essentially of a casing 11 having a top plate 12 defining an endless channel 13 along which a multiplicity of sample tubes or containers 14 are advanced in single file. Each tube 14 is slidably carried in a sleeve 15 and the sleeves are driven along the channel by a sprocket (not shown) carried by shaft 16 and rotated by driving means 17. The driving means preferably comprises an electric motor and, in the illustration given, the tubes are advanced along the channel in the direction indicated by arrow 18. The action of the drive means is regular but intermittent; that is, each tube is advanced into the position occupied by the preceding tube and is then stopped for a predetermined interval during which the operations of the delivery system A may be performed.

It will be observed that plate 12 is disposed upon surface 10 and that the upstanding sample tubes 14 normally project a slight distance above the top surface of the plate. Each tube of the series travels no more than one complete trip along the channel 13. Tubes containing fresh samples are inserted into the channel by an operator at the station designated by numeral 19 and such tubes are thereafter intermittently advanced through one or more treatment stations until they have made the full circuit, ride upwardly upon ramp 20, and are finally discharged into a waste receptacle (not shown) beneath surface 10.

The sample tubes placed into the transporter may contain a body fluid to be subjected to automatic analytical testing. While a wide variety of tests may be performed, in general such tests require the addition of one or more reagents to the body fluid, a mixing of the reagents and sample fluids, a period of incubation during which the test reaction may occur, and the final photometric analysis of the reaction mixture. In the apparatus disclosed, four treatment stations 21–24 are indicated although a greater or smaller number may be provided depending upon the number and type of different diagnostic tests to be performed. At each of the stations 21–24 a predetermined quantity of a test reagent may be introduced into selected sample tubes from a suitable source of supply as indicated diagrammatically at 26. The supply source for fluid to be delivered at each station would normally be a large bottle or other container for the test reagent and while FIG. 1 indicates such a supply source only for station 21, it is to be understood that similar supply sources are provided for delivery stations 22–24.

Station 25, unlike stations 21–24, is a withdrawal station where a portion of the fluid contained in the sample tubes is withdrawn and delivered to a photometer or other testing device for analysis.

The delivery apparatus A comprises a frame 27 having upstanding sidewalls 28 and 29, an end or backwall 30, and a front wall 31. The upper portion 31a of wall 31 is provided with a series of openings 32 through which flexible plastic tubes 33 extend. Similarly, rear wall 30 is provided with openings 34 which are aligned with openings 32 so that tubes passing through such aligned openings are disposed in parallel relation with each other.

Referring to FIGS. 1 and 8, it will be observed that each tube 33 consists of an inner tube 33a and an outer tube or sheath 33b. As previously indicated, inner tube 33a is in direct communication with a source of fluid supply 26. A pump C is interposed along the line as will be described in detail hereinafter. Tube 33a extends through the aligned openings 34 and 32 in walls 30 and 31 and then curves downwardly towards treatment station 21 and fitting 35. The fitting is in the form of a "C" clamp and is held by screw 36 in any desired position along plate member 37 supported by posts 38 above plate 12 of the transporter. The parts are constructed and arranged so that in the normal position of tube 33a its free end 39 is disposed directly above a sample tube 14 when such tube is stopped at delivery station 21.

Opening 34 in rear wall 30 may be threaded to receive a fitting or plug 40 for anchoring tube 33a against sliding movement with respect to the rear wall. It will be observed that the stretch of tubing between the rear and front walls is substantially straight and extends horizontally, whereas the section of tubing 33 in front of wall 31 is arcuate or curved and, in general, has a substantial amount of slack. As will become apparent hereinafter, the amount of slack depends on the proximity of the delivery unit A and transporter B; the greater the distance between such elements, the less slack is necessary.

Sheath 33b has one end secured within opening 41 of fitting 35. The sheath curves upwardly and rearwardly, passing through opening 32 in front panel 31a, and has its rear end 42 terminating at a point between the front and rear walls 31 and 30.

Directly beneath the parallel stretches of tubes extending between the front and backwalls is a laterally extending carriage 43 which consists in part of a horizontal bar 44 having rollers 45 at its ends which are received in horizontal slots 46 in sideplates 28 and 29. The carriage is therefore mounted for movement between the forward position illustrated in FIGS. 1 and 2 and the rearward position indicated in broken lines in FIG. 2. Reciprocatory forward and rearward motion of the carriage is achieved by motor 47, crank 48, and link 49, the latter being operatively connected to the carriage by pin 50 projecting from one end of the carriage through slot 46 (FIG. 1).

As shown in FIG. 1, a plurality of tube-gripping members 51 project upwardly through openings in top plate 52 of the carriage. Each cylindrical upstanding gripping member has a transverse opening 53 extending therethrough, such opening being in alignment with a pair of corresponding openings 32 and 34 in the front and rear walls of the frame. Thus, referring again to FIGS. 2 and 8, it will be seen that sheath 33b has its rear portion 42 extending through the opening 53 in gripping member 51. Opening 53 flares outwardly at opposite sides of the gripping member and even at its smallest inner diameter the opening is substantially larger than the outside diameter of sheath 33b. Consequently, when the gripping member is in the position shown in FIG. 2, forward and rearward movement of the carriage has no effect on the positions of tubes 33a and 33b.

Each gripping member 51 is connected to a plunger 54 and means in the form of an encased solenoid 55 are provided for shifting the gripping member into the lowered position illustrated in FIG. 8 to cause the outer sheath 33b to be gripped between the upper arc of the apertured gripping member and the top surface of carriage plate 52. When the rear portion of the sheath is so gripped and the carriage is then shifted rearwardly into the broken line position illustrated in FIG. 2, the sheath is pulled rearwardly through front plate opening 32 (in which it is freely slidable) to shorten the length of sheath disposed in front of wall 31. In other words, the slack is removed from the arcuate front section of the sheath to the extent permitted by the range of rearward travel of the carriage. Since the gripping member grips only the sheath and not the inner tube 33a, the length of inner tubing 33a in front of wall 31 remains the same. However, with the slack largely removed from the arcuate section 33 of the tube, the free end of the inner tube 33a is extended downwardly a distance equal to the extent of rearward travel of the carriage. As a result, the free end 39 of the inner tube dips downwardly into a sample tube 14 as indicated in broken lines in FIG. 2.

It has been found that the above action occurs smoothly and without buckling of the tubes. For reasons which may not be fully understood at the present time, extension of the inner tube is readily accomplished without buckling when the sheath is retracted in the manner described, whereas a definite tendency towards buckling occurs should the sheath be held stationary and the clamping force be applied directly to the inner tube to thrust that tube through the sheath into an extended position.

Tube 33a and sheath 33b are both formed from flexible material, preferably a plastic material such as polyvinyl chloride. It is to be understood that any of a wide variety of materials having the desired properties of flexibility, durability, and resistance to chemical activity may be used.

Beneath carriage 43 is a second carriage 60 having sidewalls 61, front wall 62, and rear wall 63. Rollers 64 mounted upon the sidewalls 61 are received in horizontal channels or recesses 65 in the sidewalls 28 and 29 of the frame and guide the lower carriage for horizontal reciprocatory movement between the front and rear walls of the frame.

The carriage is reciprocated by a motor 66 mounted on front wall 31 (FIG. 1) and operatively connected by shaft 67, desmodromic cams 68, riders 69, and connecting rods 70 to the front wall 62 of the carriage. As shown in FIG. 1, the drive shaft 67 is carried by a pair of plates 71 secured to the front face of frame wall 31. Each cam 68 has an outwardly projecting pin 72 which is disposed between the vertical plates 69a and 69b of rider 69, the spacing between the plates being slightly greater than the diameter of the pin to permit a minimum amount of override of the driving motor at the ends of the strokes of the carriage without causing reversal of carriage movement until the motor is reenergized and a new stroke is initiated.

Carriage 60 supports a plurality of electromagnet assemblies 73, such assemblies comprising solenoid elements 74 and core elements or plungers 75. The assemblies are arranged in parallel side-by-side relation, the solenoid casing of each assembly being secured to rear wall 63 of the carriage by nut 76. Since the assemblies are disposed in side-by-side relation, only one such assembly is visible in the side elevation of FIG. 3; however, it is to be understood that a plurality of identical assemblies are concealed from view by the one illustrated. Since the structure and operation of the multiple assemblies are the same, only one such assembly will be described herein.

Figure 2:
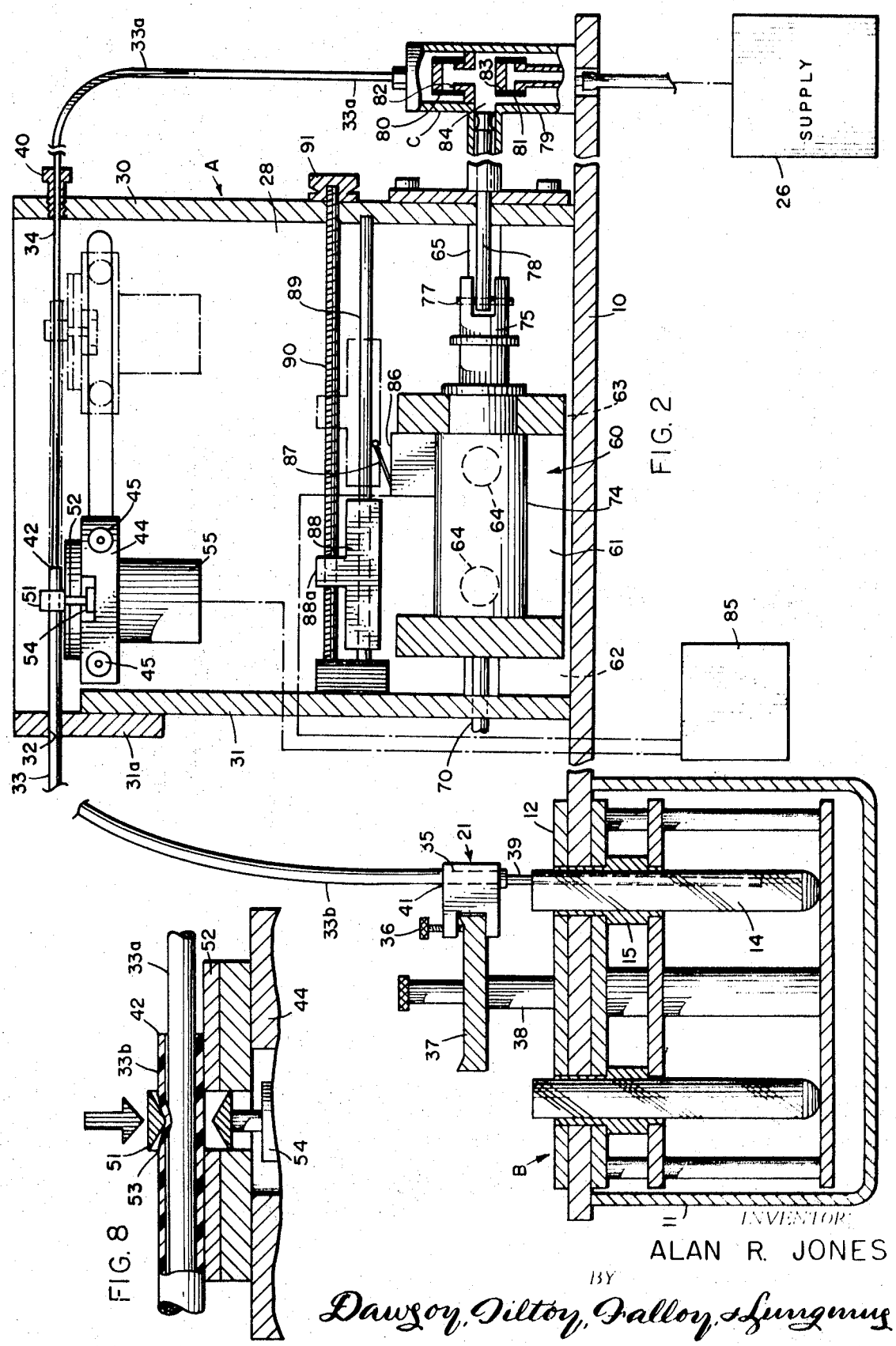
FIG. 2 is a broken sectional view taken along line 2—2 of FIG. 1.

The plunger 75 of each solenoid assembly is connected by a pin 77 to the piston shaft 78 of a pump assembly C. While any suitable pump assembly may be used, a pump of the type shown in simplified form in FIG. 2 is particularly effective. As there shown, the pump assembly C comprises a housing 79 containing a pair of unidirectional valves 80 and 81. Each of the valves consists of a sleeve of resilient stretchable material such as rubber, the respective sleeves 80 and 81 covering valve ports 82 and 83. When piston 78 executes its intake stroke sleeve 81 flexes or stretches to permit the flow of fluid from the supply source 26 into piston chamber 84, and when the piston executes its discharge stroke valve sleeve 80 similarly expands to permit the flow of fluid from the piston chamber towards sample tube 14 through flexible plastic tube 33a. Reverse flow through each of the unidirectional valves is prevented because the valve sleeves fit snugly against the ports and an increase of fluid pressure in a reverse direction only causes the valve sleeves to seal the ports more tightly.

While motor 66 reciprocates pump carriage 60 at regularly timed intervals corresponding with the intermittent operation of the transport, such movement of the carriage does not necessarily result in operation of pump assembly C. The solenoid plunger 75 is freely slidable in the solenoid casing 74 and unless the solenoid is energized movement of the carriage and the solenoid casing mounted thereon is unaccompanied by movement of the plunger. However, should the solenoid be energized, then the solenoid and its plunger will be locked against independent movement and reciprocation of the carriage will result in reciprocation of the plunger and the pump piston connected thereto. Hence, each of the plural pump assemblies C is operated only when the pump carriage reciprocates and when the particular solenoid associated with that pump is energized.

Primary control over energization of the solenoid is achieved through suitable control means diagrammatically represented in FIG. 2 by the numeral 85. Such control means for programming operation of the solenoids 74 for the pump assemblies as well as solenoids 55 for the tube extending and retracting means may be entirely electrical as is well known in connection with the development, construction, and use of shift registers. Preferably, however, the control system utilizes a mechanical-electrical shift register of the type disclosed in copending application Ser. No. 806,589, filed Mar. 12, 1969. In any case, it is believed apparent that the function of the control means 85 is to program the operation of the entire apparatus so that when a sample tube requiring the reagent of supply source 26 reaches station 21, for example, solenoid 55 will be energized to extend the delivery tube 33a into the sample tube as carriage 43 shifts in one direction (to the right as shown in FIG. 2) and, immediately thereafter, solenoid 74 will be energized so that as carriage 60 reciprocates the selected reagent will be pumped through tube 33a into sample tube 14.

The other stations 22–24 operate in a similar fashion, the delivery system being programmed to introduce the different reagents into sample tubes at the respective stations only if diagnostic tests requiring such reagents are to be performed. The operation at station 25 is substantially identical to the operation already described except that pump assembly C is reversed (i.e., turned upside-down from the position shown in FIG. 2) to withdraw fluid from the sample tubes rather than deliver fluid to such tubes. As previously indicated, the fluid so withdrawn is transmitted to a photometer or to some other suitable instrument capable of performing the required chemical analysis.

Control over the amount of fluid delivered or withdrawn through the operation of each pump assembly C is achieved by microswitches 86 mounted on carriage wall 63 adjacent each electromagnet assembly 73. The contact arm 87 of each microswitch is positioned to engage an adjustable contact member or block 88 disposed directly above each electromagnet assembly and in the path of movement of the microswitch arm. The contact member is slidably carried upon a horizontal rod 89 and an upstanding portion 88a of the member threadedly receives a parallel threaded adjustment rod 90. The adjustment rod is equipped with a knob 91 so that upon rotation of the knob the member 88 may be shifted between the solid and broken line positions illustrated in FIG. 2. Engagement between the arm 87 of the microswitch and the adjustable member 88 closes the contacts of the switch; when the arm is in the raised position illustrated in FIG. 2 the flow of current to the solenoid is interrupted. It is believed apparent that if adjustment member 88 is shifted (by rotating knob 91) into the broken line position illustrated so that solenoid 74 will be energized throughout the full cycle of movement of the pump carriage 60, then piston 78, gripped by the energized solenoid, will execute its full intake and discharge strokes. On the other hand, if the contact member 88 is shifted by rotation of adjustment knob 91 so that the carriage 60 will move to the left a selected distance before the microswitch is closed to energize the solenoid, then the extent of the intake stroke will be reduced accordingly. Thereafter, when the carriage executes its return stroke to pump fluid from pump C into tube 33a, the solenoid will be deenergized as soon as the arm of the microswitch clears contact element 88. Therefore, by adjusting the position of the contact member, the amount of fluid delivered by each pump C and conduit 33 to a sample tube 14 may be easily and accurately controlled.

Figure 3:
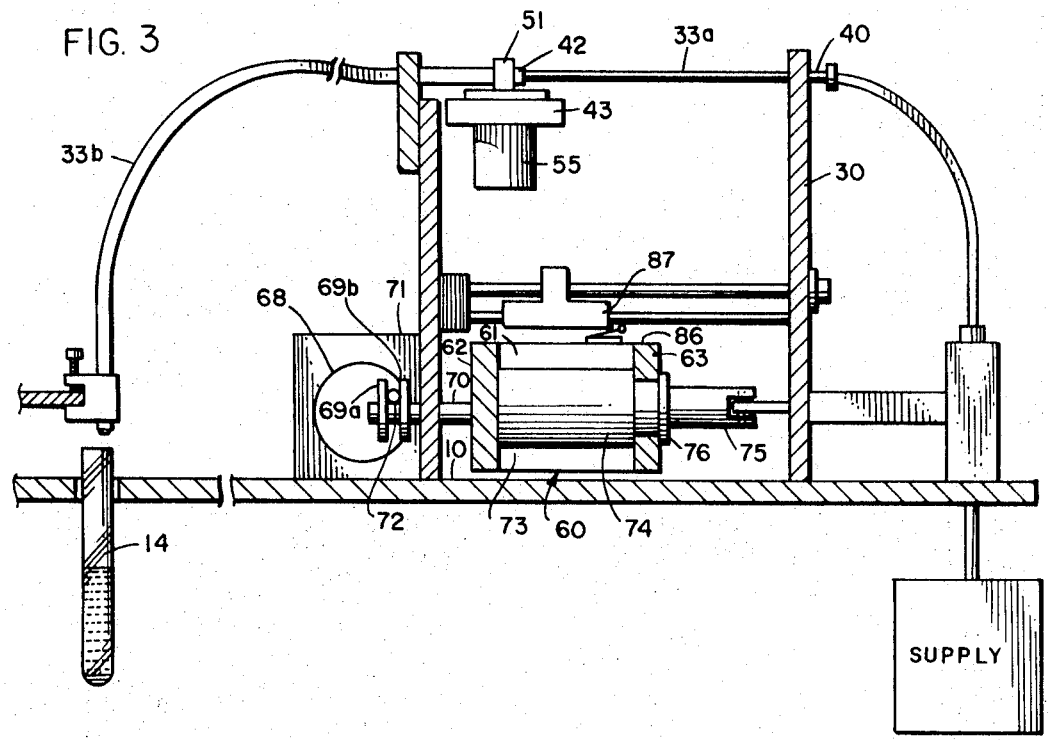
FIG. 3 is a somewhat simplified sectional view similar to FIG. 2 but in reduced scale and showing the apparatus in a starting position.
Figure 4:
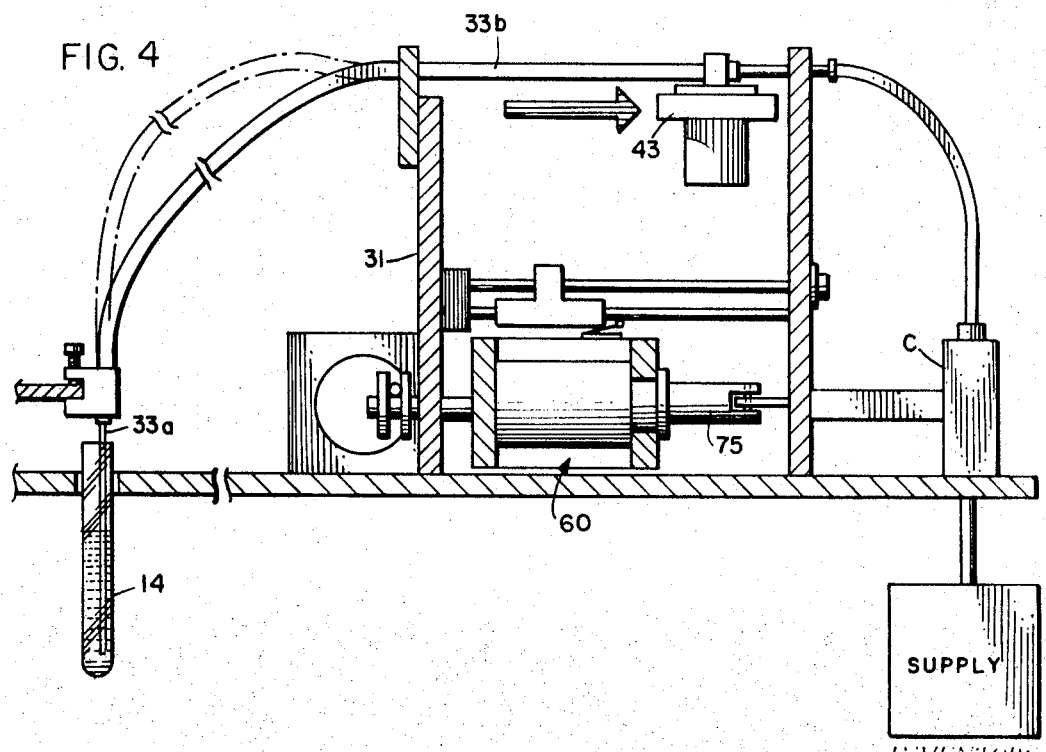
FIGS. 4–7 are sectional views similar to FIG. 3 but showing the apparatus in successive stages of operation.
Figure 5:
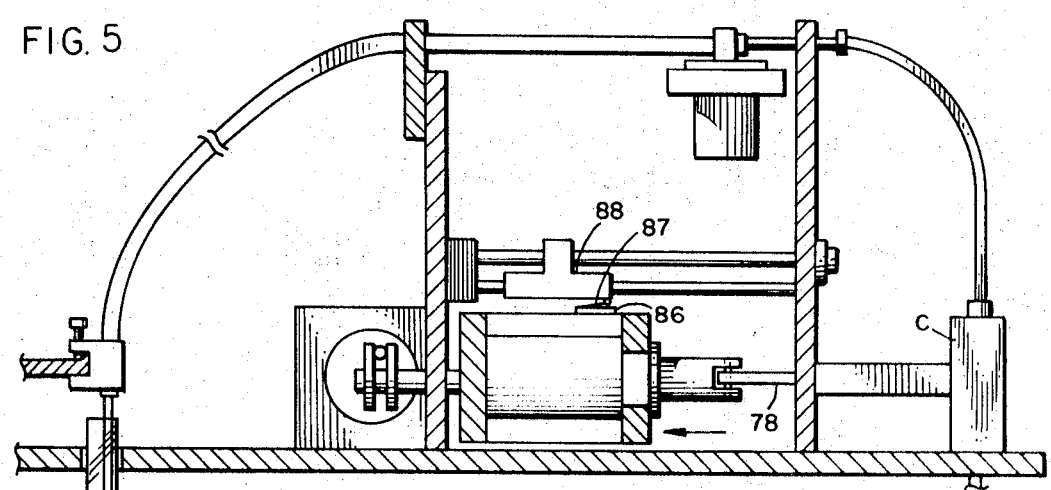
Figure 6:
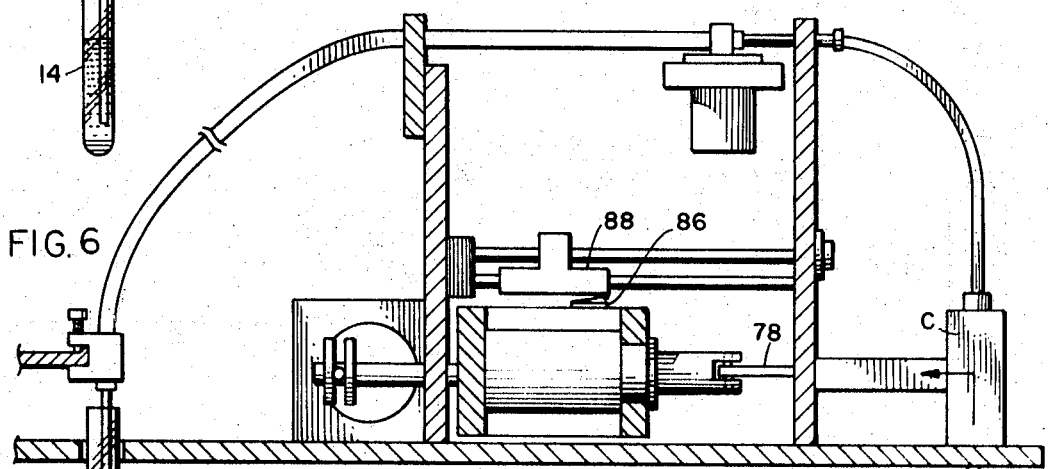
Figure 7:
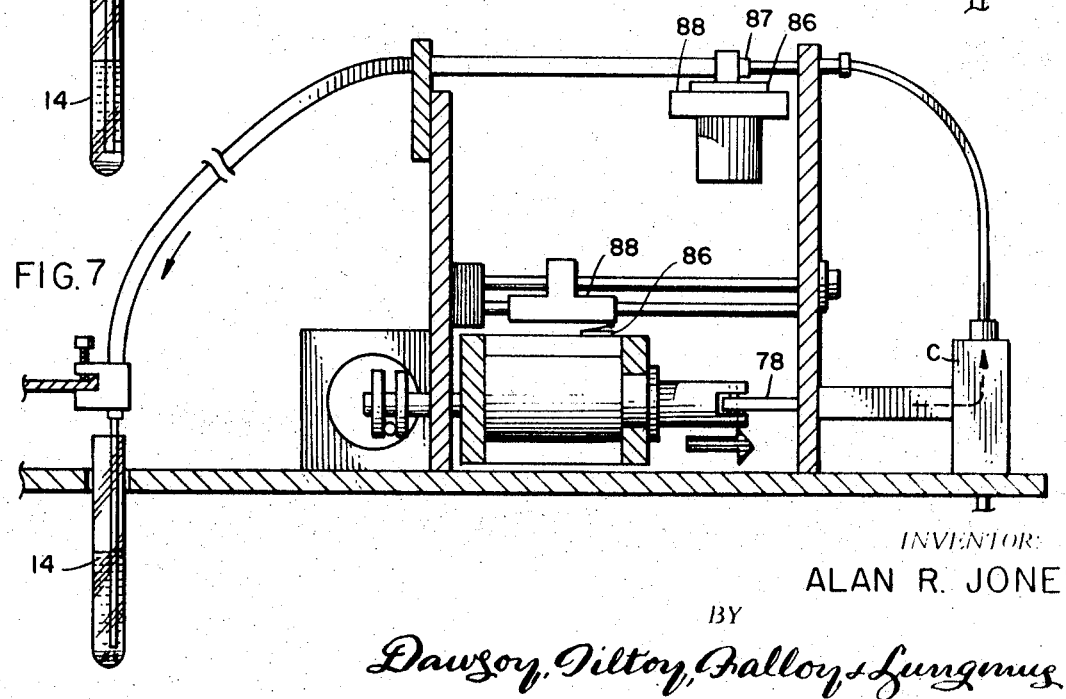

The sequence of operation is illustrated most clearly in FIGS. 3–7. FIG. 3 illustrates the apparatus in a rest condition at the moment a sample tube 14 containing a sample requiring treatment has been advanced into the corresponding treatment station. The tube-extending motor is energized to shift carriage 43 rearwardly (to the right as shown in FIG. 3) and, at the same time, solenoid 55 is energized to retract gripping element 51 to clamp the end portion 42 of sheath 33b. Rearward movement of the carriage 43 results in a straightening of the arcuate or bowed portions of the concentric tubes and in an effective shortening of the slack portion of sheath 33b in front of wall 31 (FIG. 4). Such movement of the sheath causes the free end portion of inner tube 33a (which has its intermediate portion fixed by coupling 40 to rear wall 30) to be projected downwardly into the sample tube a distance equal to the extent of retraction of the sheath (FIG. 4). When the inner tube is so extended with its free end adjacent the bottom of the sample tube 14, carriage 43 again comes to rest and the pump-driving motor 66 is energized. Pump carriage 60 commences its cycle of reciprocatory movement but no intake of fluid by pump C occurs until microswitch arm 87 engages contact member 88 to energize solenoid 74 (FIG. 5). As the microswitch closes to energize solenoid 74, the solenoid and plunger 75 become locked together as a unit and continued forward movement of the carriage 60 causes forward movement of pump piston 78 to draw a measured amount of fluid into the pump (FIG. 6). The pump then reverses direction to force the measured amount of fluid from the pump and to expel an equivalent amount of fluid into sample tube 14 (FIG. 7). As soon as microswitch arm 87 clears contact member 88 the solenoid 74 is deenergized, no further pumping action occurs, and the pump carriage returns to the starting position shown in FIG. 3. Motor 47 for the upper carriage is again energized to return carriage 43 to its original position, tube 33b is retracted from the sample vessel 14, and solenoids 55 and 74 are deenergized.

It is to be emphasized that while the operation of only a single pump has been described, the advantages of the apparatus are particularly apparent where a multiplicity of pumps and delivery tubes are involved. As the pump carriage executes its cycle of operation only those pumps associated with treatment stations at which there are sample tubes requiring the addition (or removal) of fluid will be operated. Similarly, the tube extension-retraction carriage executes its cycle of operation each time the tubes of the transporter are advanced; however, the delivery (or extraction) tubes 33a are not extended into the sample tubes (because the solenoid 55 are not energized) unless the delivery or withdrawal of fluid is required. In that event, tubes 33a are extended into only those sample tubes requiring the addition or removal of fluid.

The extension of the delivery tube 33a into the sample tube 14 and below the surface of the liquid sample contained therein is important because mixing of the fluids is achieved without splashing. It has been found that effective mixing is obtained even where a relatively low-velocity stream is discharged from the delivery tube.

As already stated, the delivery tube 33a may also serve as an extraction or withdrawal tube depending on the direction of orientation of pump assembly C. However, even where an extraction operation is performed, fluid is in fact "delivered" through the system; in that case, the delivery being away from the sample tube. Therefore, the word "delivery" as used herein is intended wherever applicable to mean fluid delivered through the pumping system, whether such delivery be towards or away from the sample tubes.

While in the foregoing an embodiment of the invention has been disclosed in considerable detail for purposes of illustration, it is to be understood by those skilled in the art that many of such details may be varied without departing from the spirit and scope of the invention.

I claim:

1. A fluid delivery system for a chemical analyzer comprising a tubular conduit adapted to extend from a source of fluid to a receiving vessel, a pump interposed along said conduit, said pump having a reciprocable pump member for pumping a quantity of fluid along said conduit in a direction from said source towards said receiving vessel when said member executes a pumping stroke, an electromagnet having a coil element and a core element, said coil and core elements normally being freely movable with respect to each other but being locked against independent relative movement when said coil element is energized, means mounting said coil element and core element for movement towards and away from each other along the line of reciprocation of said pump member, one of said coil and core elements being fixed to said pump member, power means for periodically shifting the other of said coil and core elements along the line of reciprocation of said pump member, electrical control means for selectively energizing said coil element to lock said coil and core elements together and thereby operate said pump when delivery of fluid from said source to said receiving vessel is desired, the extent of reciprocation of said pump member being directly proportional to the quantity of fluid pumped with each discharge stroke of said pump member, and adjustment means for selectively varying the position along the line of movement of said other of said coil and core elements at which said coil element is energized to control the quantity of fluid delivered by said pump.

2. The structure of claim 1 in which said last-mentioned means includes a limit switch and an adjustment member mounted upon a shaft parallel to the line of movement of said pump member, said adjustment member being movable along said shaft into a variety of selected positions of adjustment therealong, said limit switch being mounted upon one of (a) said adjustment member and (b) said other of said coil and core elements, and being engageable with the other of (a) said adjustment member and (b) said other of said coil and core elements to energize said coil at a selected position of movement of said other of said coil and core elements and thereby control the quantity of fluid to be pumped by said pump.

3. A fluid delivery system for a chemical analyzer comprising a plurality of tubular conduits each adapted to extend from a source of fluid to a receiving vessel, a plurality of pumps each being interposed along one of said conduits, each of said pumps having a reciprocable pump member for pumping a quantity of fluid along the associated conduit in a direction from said source towards a receiving vessel when said member executes a pumping stroke, a plurality of electromagnets, each electromagnet being associated with one of said pumps and having a coil element and a core element, said coil and core elements normally being freely movable with respect to each other but being locked against independent relative movement when said coil element is energized, means mounting all of said coil and core elements for independent movement along the lines of reciprocation of said pump members, one of said coil and core elements of each electromagnet being fixed to an associated one of said pump members, power-operated carriage means for intermittently shifting all of the other of said coil and core elements along the lines of reciprocation of said pump members, electrical control means for energizing selected electromagnets to lock the coil and core elements thereof together and thereby operate selected pumps of the group, the extent of reciprocation of each of said pump members being directly proportional to the quantity of fluid delivered by the pumping stroke thereof, and means for selectively varying the position along the line of movement of each of said other of said coil and core elements at which the associated coil element is energized to control the quantity of fluid delivered by each of said pumps.

4. The structure of claim 3 in which said last-mentioned means includes, in association with each of said pumps, a limit switch and an adjustment member mounted upon a shaft parallel to the line of movement of each of said pump members, each adjustment member being movable upon its shaft into any selected position of adjustment therealong, said limit switch being mounted upon one of (a) said adjustment member and (b) said other of said coil and core elements, and being engageable with the other of (a) said adjustment member and (b) said other of said coil and core elements to energize said core at a selected position of movement to control the quantity of fluid to be pumped by each of said pumps.

* * * * *